United States Patent Office 3,336,313
Patented Aug. 15, 1967

3,336,313
OCTAHYDROPHENANTHRIDINES AND
METHOD OF PREPARATION
Harry Chafetz, Poughkeepsie, N.Y., and Richard C. Anderson, Logan, Utah, assignors to Texaco Inc., New York, N.Y., a corporation of Delaware
No Drawing. Filed Mar. 31, 1964, Ser. No. 356,061
12 Claims. (Cl. 260—283)

The instant invention relates to novel compounds and to a method of preparation. More specifically, it pertains to 1,2,3,4,7,8,9,10-octahydrophenanthridines and to their method of manufacture.

The octahydrophenanthridine products of the invention are useful in amounts of between about 0.5 and 5 wt. percent as corrosion inhibitors in oil and gas wells, acidizing solutions and are further useful as corrosion inhibitors in pickling acids.

The octahydrophenanthridines contemplated herein are of the general formula:

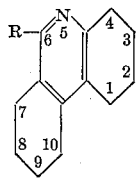

where R is a substituent selected from the group consisting of hydrogen and alkyl, alkenyl, aryl, alkaryl and aralkyl of from 1 to 20 carbons.

The products of the invention are prepared by contacting a mixture of 2-(1-cyclohexenyl)-cyclohexanone, an aldehyde of the formula RCHO where R is as heretofore defined, and ammonia in the presence of a catalyst selected from the group consisting of alumina, silica, silica-alumina and silica or alumina combined with minor amounts, e.g., between about 5 and 40 wt. percent of chromia or magnesia, and mixtures thereof.

Under advantageous conditions the reaction is conducted in the absence of oxygen, at a temperature between about 180 and 425° C., and in a mole ratio of ammonia/aldehyde/cyclohexenyl cyclohexanone of between about 100:5–1:1 and 1:5–1:1. The reaction is further described by the following equation:

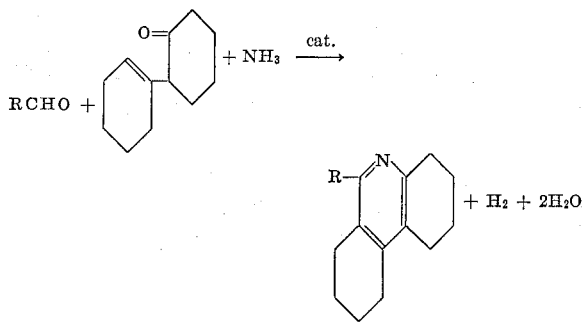

where R is as heretofore defined.

Standard procedures may be employed in eliminating oxygen from the reaction zone such as sweeping said zone prior to the reaction with an inert gas such as nitrogen.

Under preferred conditions the catalyst particle size is between about 1/16 and 1/2 inch and the average contact time between reactant and catalyst is between 3 and 20 seconds. Further, the reaction is normally conducted at atmospheric pressure but subatmospheric and superatmospheric pressures up to about 50 p.s.i.g. may also be employed.

Specific examples of the aldehyde reactants contemplated herein are formaldehyde, propionaldehyde, acetaldehyde, isobutenal, hexaldehyde, heptaldehyde, myristaldehyde, benzaldehyde, p-methylbenzaldehyde, 3-phenylpropionaldehyde and naphthylethanal.

Specific examples of the octahydrophenanthridine products contemplated herein as 1,2,3,4,7,8,9,10-octahydrophenanthridine, 6 - methyl - 1,2,3,4,7,8,9,10 - octahydrophenanthridine, 6 - ethyl - 1,2,3,4,7,8,9,10 - octahydrophenanthridine, 6 - isopropenyl - 1,2,3,4,7,8,9,10-octahydrophenanthridine, 6 - pentyl-1,2,3,4,7,8,9,10 - octahydrophenanthridine, 6 - hexyl - 1,2,3,4,7,8,9,10 - octahydrophenanthridine, 6 - phenyl - 1,2,3,4,7,8,9,10 - octahydrophenanthridine, 6 - methylphenyl - 1,2,3,4,7,8,9,10-octahydrophenanthridine, 6 - phenylethyl - 1,2,3,4,7,8,9,10-octahydrophenanthridine and 6-naphthylmethyl-1,2,3,4,7,8,9,10-octahydrophenanthridine.

EXAMPLE I

The reaction was conducted in the vapor phase and carried out in a 1 x 24" Vycor tube enclosed in an electric furnace. The temperature was sensed by a thermocouple located at the center of the heating chamber external to the glass tube. The tube was inclined at an angle of about 20° from horizontal and was packed with a 6" layer of Berl saddles at the bottom, a 7" layer of catalyst comprising 12.1 wt. percent chromia, 87.9 wt. percent alumina in the middle and a 6" layer of Berl saddles at the top. The tube was fitted at its upper end with an adaptor connected to a dropping funnel and a system for introducing a metered flow of ammonia gas. The bottom end of the tube was connected to the receiver attached to a water cooled condenser followed by a trap cooled in a dry ice-isopropanol mixture.

The prepared reaction tube was preheated at 450° C. for about 1/2 hour while being swept with 200 mls./minute of dry nitrogen and then allowed to cool to 350° C. The nitrogen stream was cut off and the ammonia gas was passed through the tube at a rate of 200 mls./minute together with equimolar amounts of 2-(1-cyclohexenyl)-cyclohexanone and n-hexaldehyde which were added at a rate of 3 drops/minute. The total amount of cyclohexanone added was 30 grams (0.2 mole) and the total amount of hexaldehyde added was 20 grams (0.2 mole). The residence time of the reactants in the tubular reactor was 2.7 seconds and the molar ratio of ammonia:aldehyde:ketone was 12/0.5/0.5. The condensation products were collected in the receiver and analyzed by gas chromatography. The fraction having a boiling point of between about 186 and 190° C. at 3 mm./Hg, a density at 20/4° C. of 1.0071 and at 25/4° C. of 0.9997, a refractive index at $n_D^{20}$ of 1.5455 and at $n_D^{25}$ of 1.5399, and a strong infrared absorption band at 6.42 and no weak bands at 2.95 and 6.05 was identified by gas chromatography as 6-pentyl-1,2,3,4,7,8,9,10-octahydrophenanthridine. This fraction weighed 33.4 grams giving a yield of 65 mole percent based on the charge ketone.

EXAMPLE II

The reaction apparatus employed was that essentially described in Example I except the reactor tube was vertical and the catalyst was 75 wt. percent silica and 25 wt. percent magnesia.

The prepared reaction tube was preheated at 450° C. for about 1/2 hour while being swept with 80 mls./minute of dry nitrogen and then allowed to cool to 300° C. The nitrogen stream was cut off and ammonia gas was passed through the tube at a rate of 300 mls./minute together with equimolar amounts of 2-(1-cyclohexenyl)-cyclohexanone and aldehyde. The residence time of the ammonia-aldehyde-ketone reactants in the tubular reactor was 5 seconds and the molar ratio of ammonia:aldehyde:ketone was 10/0.5/0.5. The condensation products were collected in the receiver and separated by fractional distillation and gas chromatography. The recovered 1,2,3,4,7,8,9,10-octahydrophenanthridine product fraction was identified by means of infrared, nuclear magnetic resonance and elemental analyses. Identification was further made by the formation of octahydrophenanthridine salt derivatives of hydrochloric acid, hydrobromic acid and picric acid. Various aldehydes in successive runs were employed. Data in respect to the recovered 1,2,3,4,7,8,9,10-octahydrophenanthridine product is reported below in Table I:

TABLE I.—6-HYDROCARBYL-1,2,3,4,7,8,9,10-OCTAHYDROPHENANTHRIDINE PRODUCT

| Run No. | Aldehyde Reactant | 6-hydrocarbyl Group | Yield Mole Percent Basis Carbonyl, Compounds Charged | Physical Properties |
|---|---|---|---|---|
| 1 | Acetaldehyde | Methyl | 16 | B.P. 148–178° C./20 mm. Hg; M.P. 56–58° C.; picrate M.P. 137–138° C. |
| 2 | n-Hexaldehyde | Pentyl | 39 | B.P. 186–188° C./3mm. Hg; picrate M.P. 129–131° C.; hydrochloride salt M.P. 151–153° C. hydrobromide salt M.P. 126–128° C. |
| 3 | Propionaldehyde | Ethyl | 54 | B.P. 135–138° C./2.9mm. Hg; picrate M.P. 150–152° C. |
| 4 | Isobutenal | Isopropenyl | 10.3 | B.P. 138° C./2.9mm. Hg. |
| 5 | n-Heptaldehyde | Hexyl | 43 | B.P. 190° C./2.6mm. Hg. |
| 6 | Myristaldehyde | Tridecyl | 17 | B.P. 219° C./0.3mm. Hg; M.P. 41–43° C. |
| 7 | Benzaldehyde | Phenyl | 12 | B.P. 190° C./3.2mm. Hg; M.P. 81–83° C.; picrate M.P. 137–139° C. |

We claim:
1. An octahydrophenanthridine of the formula:

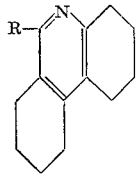

where R is a substituent selected from the group consisting of hydrogen, alkyl of 2 to 20 carbons, alkenyl of 2 to 20 carbons, aryl of 6 to 20 carbons, and alkaryl and aralkyl of from 7 to 20 carbons.
2. The compound of claim 1 where R is isopropenyl.
3. The compound of claim 1 where R is pentyl.
4. The compound of claim 1 where R is hexyl.
5. The compound of claim 1 where R is tridecyl.
6. The compound of claim 1 where R is phenyl.
7. A method of producing an octahydrophenanthridine of the formula:

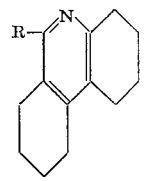

where R is a substituent selected from the group consisting of hydrogen, alkyl of 2 to 20 carbons, alkenyl of 2 to 20 carbons, aryl of 6 to 20 carbons, and alkaryl and aralkyl of from 7 to 20 carbons comprising contacting a mixture of ammonia, 2-(1-cyclohexenyl)-cyclohexanone and an aldehyde of the formula:

RCHO where R is as defined above in the presence of a catalyst selected from the group consisting of alumina, silica, silica-alumina, silica-5 to 40 wt. percent chromia, silica-5 to 40 wt. percent magnesia, alumina-5 to 40 wt. percent magnesia, alumina-5 to 40 wt. percent chromia, and mixtures thereof in a mole ratio of ammonia/cyclohexenyl cyclohexanone/aldehyde of between about 100:5–1:1 and 1:5–1:1 at a temperature between about 180 and 425° C. and in the absence of oxygen.
8. A method in accordance with claim 7 wherein said catalyst is silica-magnesia, said aldehyde is propionaldehyde and said R group is ethyl.
9. A method in accordance with claim 7 wherein said catalyst is silica-magnesia, said aldehyde is isobutenal and said R group is isopropenyl.
10. A method in accordance with claim 7 wherein said catalyst is alumina-chromia and said aldehyde is n-hexaldehyde and said R group is n-pentyl.
11. A method in accordance with claim 7 wherein said catalyst is silica-magnesia, said aldehyde is myristaldehyde and said R group is tridecyl.
12. A method in accordance with claim 7 wherein said catalyst is silica-magnesia, said aldehyde is benzaldehyde and said R group is phenyl.

References Cited
UNITED STATES PATENTS 2,425,320 8/1947 Hill _____ 252—149
2,692,268 10/1954 Cairns _____ 260—315
3,243,438 3/1966 Hellerbach et al. _____ 260—289

OTHER REFERENCES

Theobald et al. Chemical Reviews, vol. 46 179–81 (1950).

ALEX MAZEL, Primary Examiner.
DONALD G. DAUS, Assistant Examiner.